(12) United States Patent
Unoki et al.

(10) Patent No.: US 8,810,941 B2
(45) Date of Patent: Aug. 19, 2014

(54) SYSTEM, METHOD AND APPARATUS FOR SELECTION OF RESERVED AREA DATA TRACKS

(75) Inventors: Toshiroh Unoki, Kanagawa (JP); Takeshi Shikama, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 37 days.

(21) Appl. No.: 13/545,169

(22) Filed: Jul. 10, 2012

(65) Prior Publication Data

US 2014/0016224 A1   Jan. 16, 2014

(51) Int. Cl.
*G11B 5/09* (2006.01)
*G11B 20/20* (2006.01)
*G11B 5/02* (2006.01)

(52) U.S. Cl.
USPC .................................. 360/48; 360/76; 360/55

(58) Field of Classification Search
None
See application file for complete search history.

(56) References Cited

U.S. PATENT DOCUMENTS

| | | |
|---|---|---|
| 5,031,168 A | 7/1991 | Moore |
| 5,600,500 A | 2/1997 | Madsen et al. |
| 5,901,003 A | 5/1999 | Chainer et al. |
| 5,991,115 A | 11/1999 | Chainer et al. |
| 6,320,718 B1 * | 11/2001 | Bouwkamp et al. ....... 360/77.04 |
| 6,826,140 B2 | 11/2004 | Brommer et al. |
| 7,253,986 B2 | 8/2007 | Berman et al. |
| 7,428,120 B2 | 9/2008 | Berman et al. |
| 7,463,441 B2 | 12/2008 | Cho et al. |
| 7,733,589 B2 | 6/2010 | Wada et al. |
| 7,747,907 B2 | 6/2010 | Olds et al. |
| 7,920,352 B2 | 4/2011 | Inoue et al. |
| 8,014,097 B1 | 9/2011 | Sanvido |
| 8,190,837 B2 | 5/2012 | McLeod et al. |
| 2003/0133217 A1 * | 7/2003 | Nunnelley ...................... 360/75 |
| 2005/0264930 A1 | 12/2005 | Gider et al. |
| 2009/0290245 A1 * | 11/2009 | Motoki .......................... 360/15 |
| 2011/0075290 A1 | 3/2011 | Hobbet |
| 2012/0014013 A1 | 1/2012 | Bandic et al. |

FOREIGN PATENT DOCUMENTS

WO   2012058478 A1   5/2012

* cited by examiner

*Primary Examiner* — Andrew L Sniezek

(57) ABSTRACT

Selection of disk drive data tracks for the location of reserved area include providing a media disk with data tracks comprising a user data region. A location is assessed on the media disk with a highest frequency of adjacent track interference and far track interference-refresh potential. The location is then configured to be a reserved area where no user data is written. The reserved area has parameters that are read out first before the disk drive enters an operation enabled state for user interface.

22 Claims, 3 Drawing Sheets

SYSTEM, METHOD AND APPARATUS FOR SELECTION OF RESERVED AREA DATA TRACKS

BACKGROUND OF THE INVENTION

1. Field of the Disclosure

The present invention relates in general to disk drives and, in particular, to a system, method and apparatus for selection of data tracks with high ATI/FTI-Refresh potential as the location of reserved areas to capitalize on low magnetic density and low write frequency of the reserved areas.

2. Description of the Related Art

Increased magnetic disk recording density has been accompanied by further narrowing of the track pitch. When data is recorded on a particular data track of a magnetic hard disk drive (HDD), a phenomenon in which magnetic flux that has leaked from the recording head (e.g., a fringe field) affects the data that has been recorded on adjacent data tracks and far tracks. When the recorded data has been updated many times, the data that has been recorded on the adjacent data tracks and far tracks can be corrupted and have errors. Errors that can be recovered from error correction codes (ECC) are called soft read errors. However, readback of these tracks may not be recoverable from the ECC.

For adjacent tracks, this non-recovery phenomenon is known as adjacent track interference (ATI). For far tracks, this phenomenon is known as far track erasure or far track interference (FTI). Depending on the design of the write head, both ATI/FTI-refresh and FTI effects (ATI/FTI) occur during the write of a particular data track. Manufacturing tolerances for the write head and magnetic media may affect the ATI/FTI impact on the various head-media interfaces in a single HDD.

The write head is mounted to a rotary actuator such that its movement is arcuate in shape from the inner diameter of the disk to the outer diameter of the disk. Thus, geometry also may alter the impact of ATI/FTI. Since the head moves above the magnetic disk in accordance with the tracks, a skew angle is defined between a tangent of a data track on the disk and the direction of the head.

As shown in FIG. 1, the skew angle typically is arranged to be zero (0) in the center or middle diameter (MD) of the recordable media on the disk. The skew angle gradually increases toward the outer diameter (OD) as well as the inner diameter (ID). Thus, the maximum skew angle A on a positive side occurs at the outermost periphery of the data region, and the maximum skew angle B on a negative side occurs at the innermost periphery. For ease of reference, the data region of a magnetic disk may be divided into five areas where the outer peripheral side of the magnetic disk is represented by OD, the inner peripheral side by ID, the middle part by MD (skew=0), the region between OD and MD by MDOD (e.g., skew angle C), and the region between ID and MD by MDID (e.g., skew angle D).

After data writing has been performed a certain number of times on an adjacent data track, ATI/FTI may be prevented by a process of reading and write-back of the data track. This process is referred to as ATI/FTI-Refresh. To determine when an ATI/FTI-Refresh is to be performed, a Risk-Counter may be used to indicate the extent of the ATI/FTI degradation for each data track. The Risk-Counter may be updated in response to the writes of adjacent or far data tracks. When the Risk-Counter of a data track exceeds a Risk-Threshold, the ATI/FTI-Refresh is performed on that data track.

User data may be written on the disk in data blocks of, for example, 512 bytes or 4 kilobytes. These data blocks employ data encoding techniques and ECC to recover data that, when read back, includes bits in error. The data encoding and ECC have limitations in the number of bit errors that can be corrected by the electronics of the HDD. If there are too many bits in error, not all data bits can be recovered and the data block is considered unrecoverable. Thus, if the ATI/FTI degradation is too far along then the data block in a data track may be unrecoverable. The ATI/FTI-Refresh is intended to alert the HDD electronics before the degradation has progressed too far. When the Risk-Threshold has been exceeded for a data track, that data track is read back, any soft data errors are corrected using the data encoding and ECC, then the corrected user data is written back to the disk at the same track location.

Because the relevant data is read out of the entire circumference of the data track and rewritten on the data track in an ATI/FTI-Refresh, commands from the host computer to which the HDD is coupled cannot be processed during that period. Consequently, the performance of the HDD is degraded during these periods.

Certain tracks on a disk may be set aside as a maintenance area or reserved area (RA) to store various parameters of the HDD that are unique to that HDD. When the HDD is powered on, these parameters are read out first before the HDD enters the operation enabled state. Accordingly, since the RA plays a very important role for the HDD, the erasure of data in this data region by ATI/FTI-Refresh must be prevented. Therefore, the RA typically has a lower magnetic recording density than that of a user data region, and the possibility of data erasure due to ATI/FTI is extremely low.

The RA usually is placed in one location at approximately the center part of the magnetic disk. The RA is often written to very infrequently, and some areas are only written once (though they may be read frequently, especially at HDD power on). Because of the infrequent writing in the RA and the lower magnetic density, the ATI/FTI-Refresh is very infrequent in the RA. Although these designs are workable, continued improvements without HDD performance degradation would be desirable.

SUMMARY

Embodiments of a system, method and apparatus for selection of data tracks for the location of reserved area are disclosed. For example, a method of configuring a HDD may comprise providing a media disk with data tracks comprising a user data region; assessing a location on the media disk with a highest frequency of ATI/FTI-Refresh potential; and configuring the location to be a RA where no user data is written, the RA having parameters that are read out first before the HDD enters an operation enabled state for user interface.

In other embodiments, a method of configuring a HDD may comprise providing a media disk with data tracks comprising a user data region having variable track pitches from an ID of the media disk to an OD of the media disk; assessing a location on the media disk with a smallest track pitch; and then configuring the location to be a RA where no user data is written, the RA having parameters that are read out first before the HDD enters an operation enabled state for user interface. The RA also may comprise a location on the media disk with a highest frequency of ATI/FTI-Refresh potential.

An embodiment of a HDD may comprise an enclosure and a media disk rotatably mounted to the enclosure. The media disk may have data tracks for storing data. An actuator may be movably mounted to the enclosure and may have a slider for reading data from and writing data to the data tracks. The data tracks may comprise at least two RAs that are separated from each other by at least a portion of a user data region for writing user data thereto. Each of the RAs may have parameters that are read out first before the HDD enters an operation enabled state for user interface.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for selection of data tracks with high ATI/FTI-Refresh potential as the location of Reserved Areas (RAs) to take advantage of low magnetic density and low write frequency of the RAs are disclosed. For example, some embodiments focus on the existence of specified data regions that frequently generate ATI/FTI-Refreshes, and places RAs in those regions. In particular, RAs may be placed in a plurality of regions where the interval (track pitch) between data tracks is extremely small due to the geometric dimensions of the write-head and the skew of the write-head as it goes from the inner diameter of the disk to the outer diameter of the disk.

The frequent generation of ATI/FTI-Refreshes may be reduced or prevented in the specified data regions because an RA is not used as a user data region. In addition, data is not erased when an ATI/FTI-Refresh is generated in the RA because the magnetic recording density is lower in an RA than in a user data region and a margin is set with the objective of data protection. An embodiment provides a magnetic HDD that prevents the erasure of data recorded in a data track of the disk when data is written to an adjacent data track, without degrading the HDD performance, by placing RAs in the specified data regions that frequently generate ATI/FTI-Refreshes.

In a region having a large skew angle, the risk of ATI/FTI-Refresh generation is high because the magnetic flux leakage to the data track is large. Therefore, in the regions near the outermost periphery and the innermost periphery of the data tracks, the track pitch is finely adjusted over the entire surface of the media disk so that the interval or track pitch between data tracks becomes relatively large.

Figure 1:
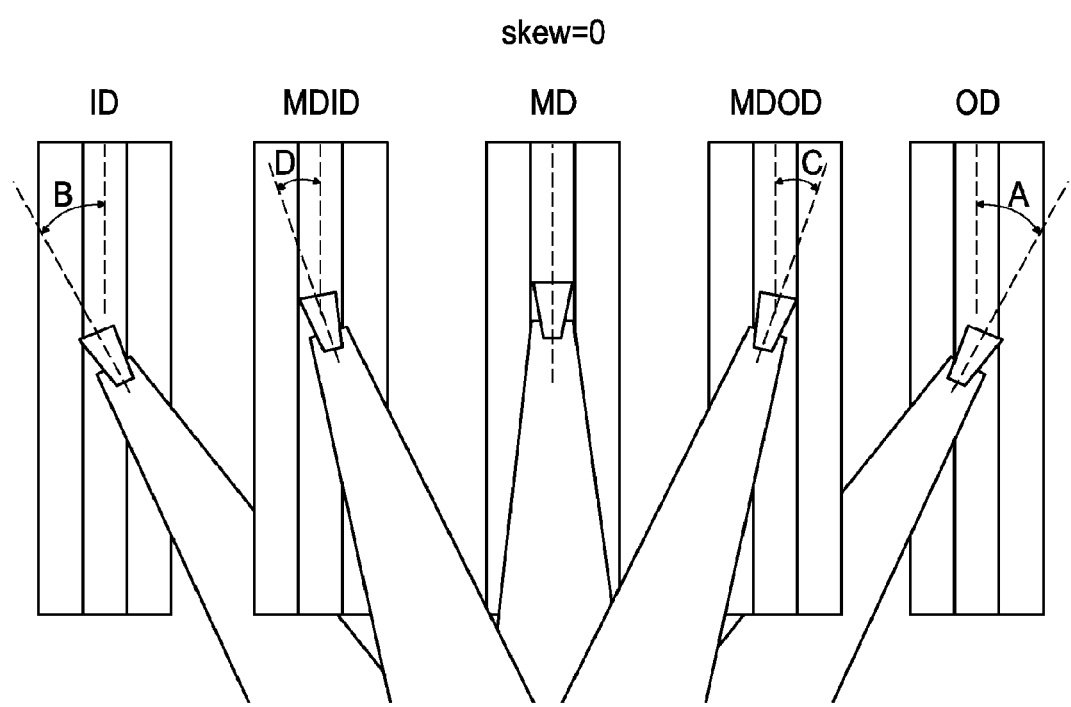
FIG. 1 is a schematic top view showing the conventional relationship between the position of a head and tracks on a media disk to define skew angles.
Figure 2:
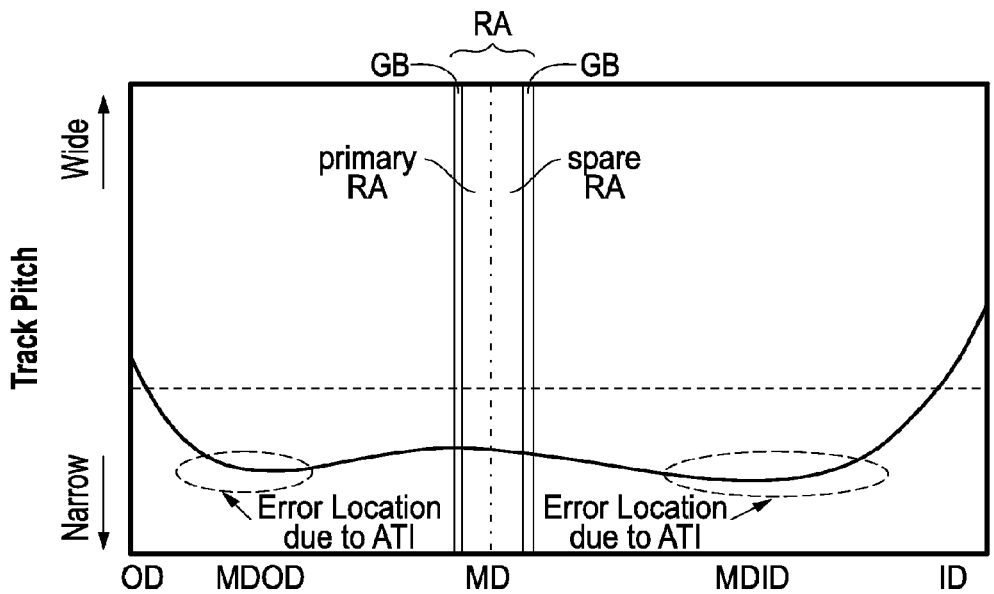
FIG. 2 is a schematic diagram showing the conventional variation in track pitch across a media disk, and disk regions that are prone to generating the ATI/FTI-Refresh process.

FIG. 2 is a schematic diagram showing variation in the track pitch (vertical axis) with respect to the radial position on the disk (horizontal axis). As described herein for FIG. 1, because the skew angle is large and the risk of ATI/FTI-Refresh generation also is large at the OD and ID, the track pitch over the entire disk region is adjusted or varied so that the track pitch in the at-risk regions is increased. To compensate for those adjustments, the track pitch is extremely small at the MDOD and MDID. It should be apparent that many other patterns and configurations for varying track pitch may be employed depending on the application.

In FIG. 2, the regions that easily generate ATI/FTI-Refreshes corresponding to positions on the media disk are indicated by the dashed lines. Essentially, ATI/FTI-Refreshes are expected to be generated at a low frequency in the MD region since it requires a small skew angle. Conversely, refreshes are expected to be generated at a high frequency in the OD and ID regions since they require large skew angles.

In addition, FIG. 2 also indicates that the ATI/FTI-Refresh generation frequency is expected to be extremely high in (a) the MDOD region slightly to the inside of the outermost periphery, and in (b) the MDID region slightly to the outside of the innermost periphery. Refreshes will occur more frequently in these regions than in the OD and ID regions which should have a high ATI/FTI-Refresh generation frequency because of the effect of the skew angle. The reason is that, as described above, the track pitches are adjusted to be relatively large in the OD and ID regions.

As stated herein, the reserved area RA is located in the data tracks. The only information written in the RA is the data needed for the HDD to function. Thus, no user data is written in the RA. For example, when RA data is read or written, the RA data contains various parameters and fault location information of the media disk. In addition, when the HDD is initially powered up, the HDD enters an operation enabled state by reading out data from the RA. The information in the RA must be adequately protected because the information is indispensable for the HDD to function.

In some embodiments, about 100 data tracks may be secured as the region for recording the various types of information described above for the RA. In addition, about 100 additional data tracks may be secured as a spare RA region. These two regions may be adjacent each other and have a guard band GB of 32 data tracks on each side. Thus, as shown in FIG. 2, the RA may comprise a single region having about 264 data tracks. Although specific numbers of data tracks are mentioned for the RA, it should be apparent that the actual number of data tracks set aside for the RA may be varied, and is less relevant than the advantages of improving performance of the HDD.

In addition, in order to better protect data in the RA, data may be written to every other data track in the RA. Specifically, the track pitch in the RA may be twice that in the user data region. Therefore, there is a margin in terms of magnetic recording, and there is diminished risk of ATI/FTI-Refresh generation. In addition, the RA typically is located in the middle region MD of the media disk, as shown in FIG. 2. The reason for using the MD region is that it is most readily accessible from any position on the media disk.

In some embodiments, the RA may be divided and separated into two or more locations. For example, the RA may comprise two locations at the MDOD and MDID regions described herein. If a region having a high frequency of ATI/FTI-Refresh generation is set aside or reconfigured as an RA, the amount of user data subjected to ATI/FTI-Refreshes is reduced. In addition, ATI/FTI-Refreshes are not generated with respect to the important information recorded in the RA and the HDD functions as normal because the track pitch in the RA is larger than that of the user data region. Moreover, the performance of the HDD does not degrade because of frequent ATI/FTI-Refresh operations, which would have otherwise occurred if the new RA region were used for user data.

Figure 3:
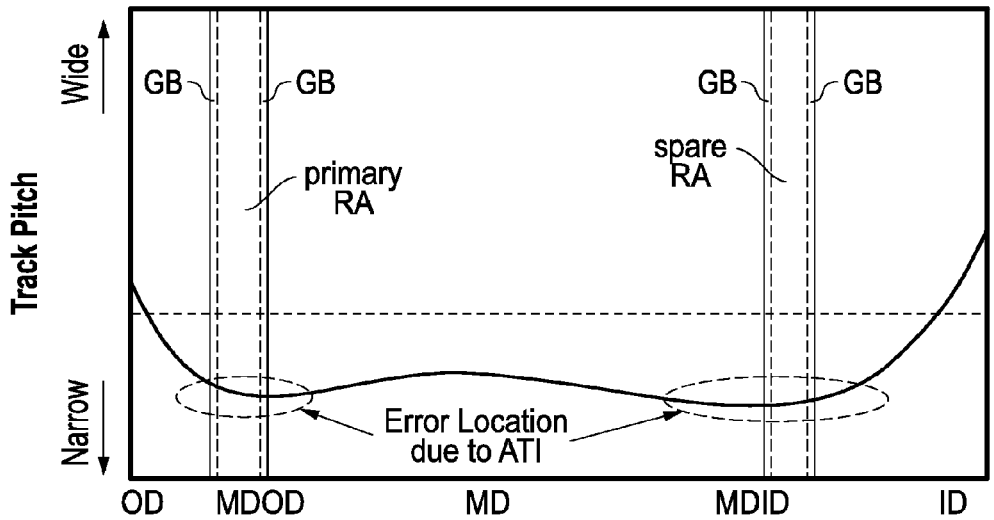
FIG. 3 is a schematic diagram showing an embodiment of Reserved Areas on a media disk.

FIG. 3 is a schematic diagram of an embodiment of locations of the RAs based on the track pitch variation shown in FIG. 2. Since the track pitch is extremely small (i.e., the smallest) at the MDOD and MDID regions, the RAs are positioned to include these minimum track pitch regions. As an example of the roles of the two RAs shown in FIG. 3, the MDOD side is used first as the primary RA, and the MDID side is used second as the spare RA. Together the primary and spare RAs comprise the entire RA. In some embodiments, each of the primary and spare RA comprise about 164 tracks (including a guard band on each side), for a total of about 328 tracks. Their track pitch is unmodified.

To prevent a reduction in the number of tracks available for user data, the data tracks in the RA may be divided into two or more parts and placed in those areas of the disk with smaller track pitches. The RAs may be placed in two or more locations corresponding to the number of regions having a high frequency of ATI/FTI-Refresh generation, namely the number of locations where the track pitch is relatively small compared to the other track pitches. The roles of each RA may be a primary RA or a spare RA. The data tracks of an original RA may be divided into a plurality of parts.

Figure 4:
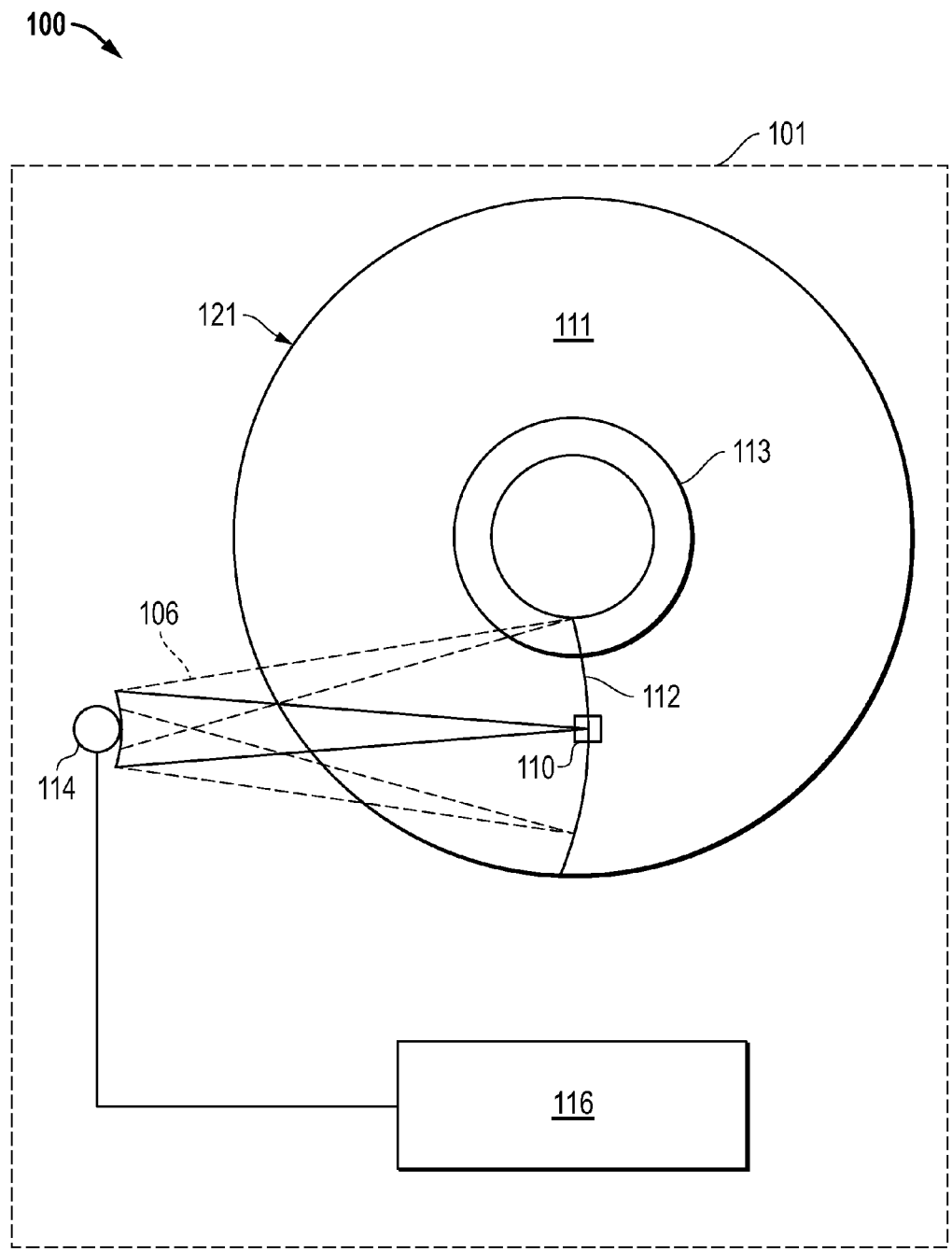
FIG. 4 is a schematic diagram of an embodiment of a disk drive.

FIG. 4 depicts a hard disk drive assembly 100 comprising a housing or enclosure 101 with one or more media disks 111 rotatably mounted thereto. The disk 111 comprises magnetic recording media rotated at high speeds by a spindle motor (not shown) during operation. Disk 111 may be configured, manufactured and fabricated as described elsewhere herein.

Magnetic data tracks 113, which may be concentric, are formed on either or both of the disk surfaces to receive and store information. The tracks are formed by the creation of bit-patterned islands with one magnetic property which are surrounded by material with a different magnetic property.

A write head is used to direct the magnetic state of the magnetic bits to one of two directions to write data. The resting state of the magnetization of the bit can be pointed perpendicular to the plane of the disk. A read head is used to detect which direction the magnetization is pointed in. Typically the read and write heads are integrated on a single slider and the slider is attached to a suspension which is rotated to different radii on the disk to read and write information from various tracks. The read head is also uses to control servo positioning of the head.

Embodiments of a read/write slider 110 having read/write heads may be moved across the disk surface by an actuator assembly 106, allowing the slider 110 to read and/or write magnetic data to a particular track 113. The actuator assembly 106 may pivot on a pivot 114 or by a linear actuator. The actuator assembly 106 may form part of a closed loop feedback system, known as servo control, which dynamically positions the read/write slider 110 to compensate for thermal expansion of the magnetic recording media 111 as well as vibrations and other disturbances or irregularities. Also involved in the servo control system is a complex computational algorithm executed by a microprocessor, digital signal processor, or analog signal processor 116 that receives data address information from a computer, converts it to a location on the disk 111, and moves the read/write slider 110 accordingly.

In some embodiments of hard disk drive systems, read/write sliders 110 periodically reference servo patterns recorded on the disk to ensure accurate slider positioning. Servo patterns may be used to ensure a read/write slider 110 follows a particular track 113 accurately, and to control and monitor transition of the slider 110 from one track to another. Upon referencing a servo pattern, the read/write slider 110 obtains head position information that enables the control circuitry 116 to subsequently realign the slider 110 to correct any detected error.

Servo patterns or servo sectors may be contained in engineered servo sections 112 that are embedded within a plurality of data tracks 113 to allow frequent sampling of the servo patterns for improved disk drive performance, in some embodiments. In a typical magnetic recording media 111, embedded servo sections 112 may extend substantially radially from the center of the magnetic recording media 111, like spokes from the center of a wheel. The servo features may be similarly sized to the data features or may be larger. The size of the features is determined by the mask pattern. Unlike spokes however, servo sections 112 form a subtle, arc-shaped path calibrated to substantially match the range of motion of the read/write slider 110. Both sides of the disk can be patterned.

The system, method and apparatus of one or more RAs, as described herein, maybe be readily incorporated into hard disk drive assembly 100.

In some embodiments, a method of configuring a HDD may comprise providing a media disk with data tracks comprising a user data region; assessing a location on the media disk with a highest frequency of adjacent track interference and far track interference (ATI/FTI)-Refresh potential; and configuring the location to be a reserved area (RA) where no user data is written, the RA having parameters that are read out first before the HDD enters an operation enabled state for user interface.

In other embodiments, the RA has a lower magnetic recording density than the user data region. The RA may have a smaller track pitch than a majority of the user data region, or the smallest track pitch compared to the user data region. The track pitch of the data tracks may be varied from an inner diameter of the media disk to an outer diameter of the media disk.

A skew angle may be defined between a tangent of a data track on the media disk and a direction of a head of the HDD. The skew angle may be about zero (0) in a middle diameter (MD) of the media disk. The skew angle may increase toward an outer diameter (OD) and toward an inner diameter (ID). The media disk may have a MDOD region between OD and MD, and a MDID region between ID and MD. The track pitch may be smallest adjacent the MDOD and MDID.

Alternatively, the RA may comprise at least two RAs that are separated from each other by at least a portion of the user data region for writing user data thereto. Each of the RAs may have parameters that are read out first before the HDD enters the operation enabled state for user interface. The at least two RAs may comprise a primary RA and a spare RA. Each side of each of the primary RA and the spare RA may have a guard band of data tracks. In addition, data may be written to every other data track in each of the primary RA and the spare RA.

In other embodiments, a method of configuring a HDD may comprise providing a media disk with data tracks comprising a user data region having variable track pitches from an inner diameter (ID) of the media disk to an outer diameter (OD) of the media disk; assessing a location on the media disk with a smallest track pitch; and then configuring the location to be a reserved area (RA) where no user data is written, the RA having parameters that are read out first before the HDD enters an operation enabled state for user interface. The RA also may comprise a location on the media disk with a highest frequency of adjacent track interference and far track interference (ATI/FTI)-Refresh potential. These embodiments may be configured in alternate versions as described throughout this specification.

An embodiment of a HDD may comprise an enclosure and a media disk rotatably mounted to the enclosure. The media disk may have data tracks for storing data. An actuator may be movably mounted to the enclosure and may have a slider for reading data from and writing data to the data tracks. The data tracks may comprise at least two reserved areas (RAs) that are separated from each other by at least a portion of a user data region for writing user data thereto. Each of the RAs may have parameters that are read out first before the HDD enters an operation enabled state for user interface.

In other embodiments, the RAs may have a lower magnetic recording density than the user data region. The RAs may have a smaller track pitch than a majority of the user data region, or the smallest track pitch compared to the user data region. The track pitch of the data tracks may be varied from an inner diameter of the media disk to an outer diameter of the media disk. The skew angle may be defined between a tangent of a data track on the media disk and a direction of a head on the slider, the skew angle is about zero (0) in the MD of the media disk, the skew angle increases toward the OD and toward the ID, the media disk has a MDOD region between OD and MD, and a MDID region between ID and MD, and the track pitch may be smallest adjacent the MDOD and MDID. The at least two RAs may comprise a primary RA and a spare RA. Each side of each of the primary RA and the spare RA may have a guard band of data tracks. In addition, data may be written to every other data track in each of said at least two RAs.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of configuring a hard disk drive (HDD), comprising:
   (a) providing a media disk with data tracks comprising a user data region;
   (b) assessing a location on the media disk with a highest frequency of adjacent track interference and far track interference (ATI/FTI)-Refresh potential; and
   (c) configuring the location to be a reserved area (RA) where no user data is written, the RA having parameters that are read out first before the HDD enters an operation enabled state for user interface.

2. A method according to claim 1, wherein the RA has a lower magnetic recording density than the user data region.

3. A method according to claim 1, wherein the RA has a smaller track pitch than a majority of the user data region.

4. A method according to claim 1, wherein the RA has a smallest track pitch compared to the user data region.

5. A method according to claim 1, wherein a track pitch of the data tracks is varied from an inner diameter of the media disk to an outer diameter of the media disk.

6. A method according to claim 1, wherein a skew angle is defined between a tangent of a data track on the media disk and a direction of a head of the HDD, the skew angle is about zero (0) in a middle diameter (MD) of the media disk, the skew angle increases toward an outer diameter (OD) and toward an inner diameter (ID), the media disk has a MDOD region between OD and MD, and a MDID region between ID and MD, and a track pitch is smallest adjacent the MDOD and MDID.

7. A method according to claim 1, wherein the RA comprises at least two RAs that are separated from each other by at least a portion of the user data region for writing user data thereto, and each of the RAs has parameters that are read out first before the HDD enters the operation enabled state for user interface.

8. A method according to claim 7, wherein the at least two RAs comprise a primary RA and a spare RA, and each side of each of the primary RA and the spare RA has a guard band of data tracks.

9. A method according to claim 7, wherein data is written to every other data track in each of said at least two RAs.

10. A method of configuring an HDD, comprising:
(a) providing a media disk with data tracks comprising a user data region having variable track pitches from an inner diameter (ID) of the media disk to an outer diameter (OD) of the media disk;
(b) assessing a location on the media disk with a smallest track pitch; and then
(c) configuring the location to be a reserved area (RA) where no user data is written, the RA having parameters that are read out first before the HDD enters an operation enabled state for user interface.

11. A method according to claim 10, wherein the RA also comprises a location on the media disk with a highest frequency of adjacent track interference and far track interference (ATI/FTI)-Refresh potential.

12. A method according to claim 10, wherein a skew angle is defined between a tangent of a data track on the media disk and a direction of a head of the HDD, the skew angle is about zero (0) in a middle diameter (MD) of the media disk, the skew angle increases toward the OD and toward the ID, the media disk has a MDOD region between OD and MD, and a MDID region between ID and MD, and the smallest track pitch is adjacent the MDOD and MDID.

13. A method according to claim 10, wherein the RA comprises at least two RAs that are separated from each other by at least a portion of the user data region for writing user data thereto, and each of the RAs has parameters that are read out first before the HDD enters the operation enabled state for user interface.

14. A method according to claim 13, wherein the at least two RAs comprise a primary RA and a spare RA, and each side of each of the primary RA and the spare RA has a guard band of data tracks.

15. A method according to claim 13, wherein data is written to every other data track in each of said at least two RAs.

16. A hard disk drive (HDD), comprising:
an enclosure;
a media disk rotatably mounted to the enclosure, the media disk having data tracks for storing data;
an actuator movably mounted to the enclosure and having a slider for reading data from and writing data to the data tracks; and
the data tracks comprise at least two reserved areas (RAs) that are separated from each other by at least a portion of a user data region for writing user data thereto, and each of the RAs has parameters that are read out first before the HDD enters an operation enabled state for user interface, and the RAs comprise locations on the media disk with a highest frequency of adjacent track interference and far track interference (ATI/FTI)-Refresh potential.

17. A HDD according to claim 16, wherein the RAs have a lower magnetic recording density than the user data region.

18. A HDD according to claim 16, wherein the RAs have a smaller track pitch than a majority of the user data region.

19. A HDD according to claim 16, wherein the RAs have a smallest track pitch compared to the user data region.

20. A HDD according to claim 16, wherein a track pitch of the data tracks is varied from an inner diameter of the media disk to an outer diameter of the media disk.

21. A HDD according to claim 16, wherein a skew angle is defined between a tangent of a data track on the media disk and a direction of a head on the slider, the skew angle is about zero (0) in a middle diameter (MD) of the media disk, the skew angle increases toward an outer diameter (OD) and toward an inner diameter (ID), the media disk has a MDOD region between OD and MD, and a MDID region between ID and MD, and a track pitch is smallest adjacent the MDOD and MDID.

22. A HDD according to claim 16, wherein the at least two RAs comprise a primary RA and a spare RA, and each side of each of the primary RA and the spare RA has a guard band of data tracks.

* * * * *